(12) United States Patent
Kim

(10) Patent No.: US 9,121,517 B2
(45) Date of Patent: Sep. 1, 2015

(54) RUPTURE DISK AND GAS INSULATED SWITCHGEAR HAVING THE SAME

(71) Applicant: HALLA INDUSTRIAL CO., LTD., Saha-gu, Busan (KR)

(72) Inventor: Gap-Dong Kim, Busan (KR)

(73) Assignee: Halla Industrial Co., Ltd., Saha-gu, Busan (KR)

( * ) Notice: Subject to any disclaimer, the term of this patent is extended or adjusted under 35 U.S.C. 154(b) by 142 days.

(21) Appl. No.: 13/781,931

(22) Filed: Mar. 1, 2013

(65) Prior Publication Data

US 2014/0014194 A1    Jan. 16, 2014

(30) Foreign Application Priority Data

Jul. 16, 2012    (KR) .................. 10-2012-0077055
Aug. 30, 2012    (KR) .................. 10-2012-0095646

(51) Int. Cl.
*F16K 17/40*    (2006.01)
*F16K 17/16*    (2006.01)

(52) U.S. Cl.
CPC ............. *F16K 13/04* (2013.01); *F16K 17/1613* (2013.01); *Y10T 137/1692* (2015.04)

(58) Field of Classification Search
CPC ................ Y10T 137/1744; Y10T 137/1729; Y10T 137/1699; Y10T 137/1692; Y10T 137/1752; Y10T 137/1759; F16K 13/04; F16K 17/1613
USPC .......... 137/68.27, 68.25, 68.21, 68.19, 68.28, 137/68.29
See application file for complete search history.

(56) References Cited

U.S. PATENT DOCUMENTS

| | | | | | |
|---|---|---|---|---|---|
| 2,766,904 | A | * | 10/1956 | Philip | 220/89.2 |
| 3,445,032 | A | * | 5/1969 | Hansen et al. | 220/89.2 |
| 3,704,807 | A | * | 12/1972 | Lidgard | 220/89.2 |
| 3,722,734 | A | * | 3/1973 | Raidl, Jr. | 220/89.2 |
| 3,881,629 | A | * | 5/1975 | Shaw et al. | 220/89.2 |
| 4,512,491 | A | * | 4/1985 | DeGood et al. | 220/89.2 |
| 4,759,460 | A | * | 7/1988 | Mozley | 220/89.2 |
| 4,777,974 | A | * | 10/1988 | Swift et al. | 137/14 |
| 4,819,823 | A | * | 4/1989 | Kadakia et al. | 220/89.2 |
| 5,036,632 | A | * | 8/1991 | Short et al. | 52/1 |
| 5,080,124 | A | * | 1/1992 | McGregor et al. | 137/68.26 |
| 5,167,337 | A | * | 12/1992 | Short et al. | 220/89.2 |
| 5,368,180 | A | * | 11/1994 | Farwell et al. | 220/89.2 |
| 5,558,114 | A | * | 9/1996 | Strelow | 137/68.27 |
| 6,006,938 | A | * | 12/1999 | Mozley et al. | 220/89.2 |
| 6,318,576 | B1 | * | 11/2001 | Graham et al. | 220/89.2 |
| 6,378,544 | B1 | * | 4/2002 | DiBello | 137/68.25 |

(Continued)

FOREIGN PATENT DOCUMENTS

KR    101003307 B1 * 12/2010 ............ H01H 33/56

*Primary Examiner* — Craig Schneider
*Assistant Examiner* — Minh Le
(74) *Attorney, Agent, or Firm* — Davis & Bujold, P.L.L.C.; Michael J. Bujold

(57) ABSTRACT

A rupture disk for a gas insulated switchgear which includes a thin dome plate that includes a first flange portion and a first dome-shaped portion formed in a dome shape, at the center of the first flange portion; and a rupture guide plate which includes a second flange portion, laminated on the first flange portion, and a second dome-shaped portion has a plurality of slots formed therein to define a rupture shape so that a part of the first dome-shaped portion is ruptured, in a predetermined shape, when an internal pressure increases. End portions of slots, disposed at both edges among the plurality of slots, are provided with rupture restriction openings, respectively, to configure a hinge portion of the second dome-shaped portion.

13 Claims, 16 Drawing Sheets

(56) References Cited

U.S. PATENT DOCUMENTS

| | | | |
|---|---|---|---|
| 6,431,383 B1* | 8/2002 | Mozley et al. | 220/89.1 |
| 7,017,767 B2* | 3/2006 | Eijkelenberg et al. | 220/89.2 |
| 7,600,527 B2* | 10/2009 | Shaw et al. | 137/68.27 |
| 7,743,784 B2* | 6/2010 | Rutter | 137/68.28 |
| 2001/0006075 A1* | 7/2001 | Muddiman et al. | 137/68.29 |
| 2005/0103786 A1* | 5/2005 | Eijkelenberg et al. | 220/89.2 |
| 2007/0215207 A1* | 9/2007 | Mattison | 137/68.27 |
| 2008/0060702 A1* | 3/2008 | Muddiman | 137/68.27 |
| 2009/0302035 A1* | 12/2009 | Shaw et al. | 220/89.2 |
| 2010/0258200 A1* | 10/2010 | Walker et al. | 137/68.25 |

* cited by examiner

Internal Pressure

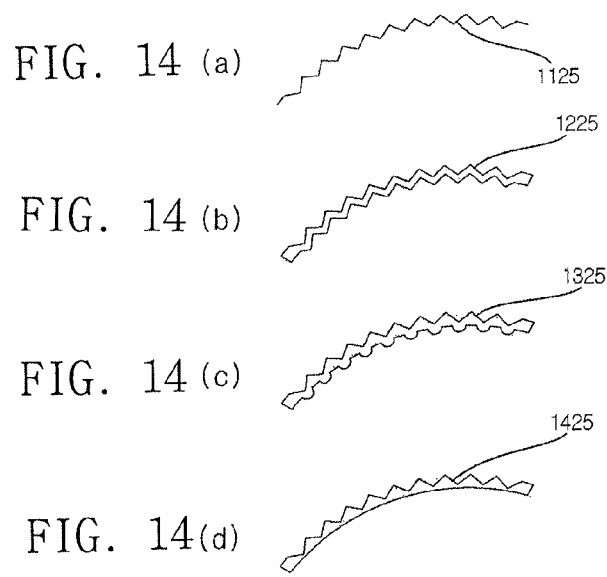
FIG. 14 (a)
FIG. 14 (b)
FIG. 14 (c)
FIG. 14 (d)
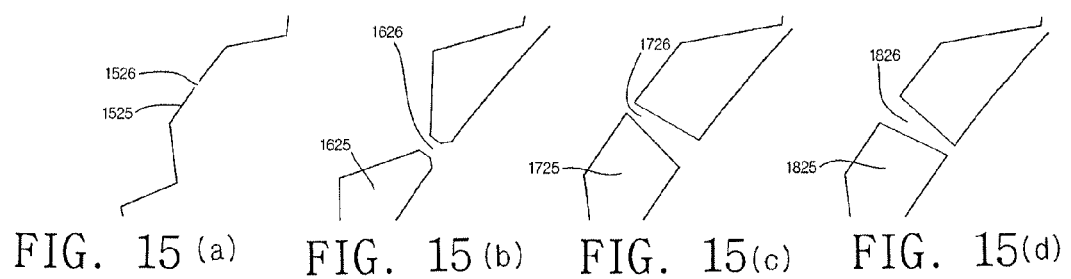
FIG. 15 (a)   FIG. 15 (b)   FIG. 15 (c)   FIG. 15 (d)

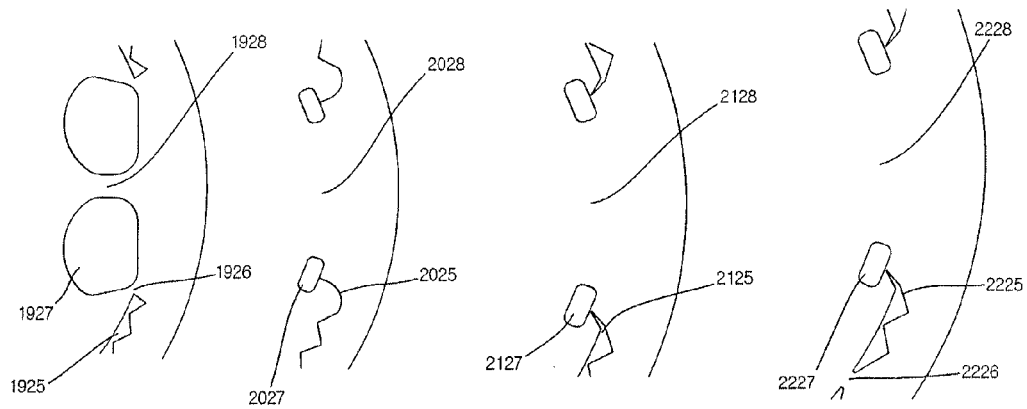
FIG. 16(a)　FIG. 16(b)　FIG. 16(c)　FIG. 16(d)
FIG. 17
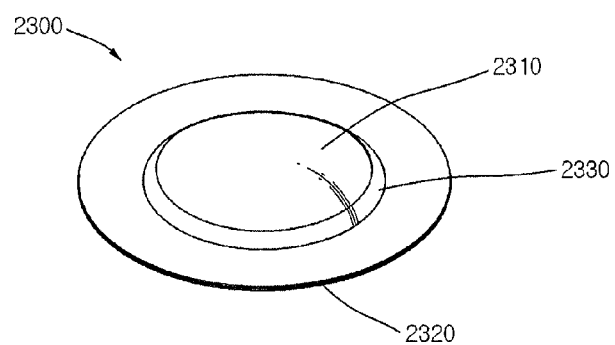

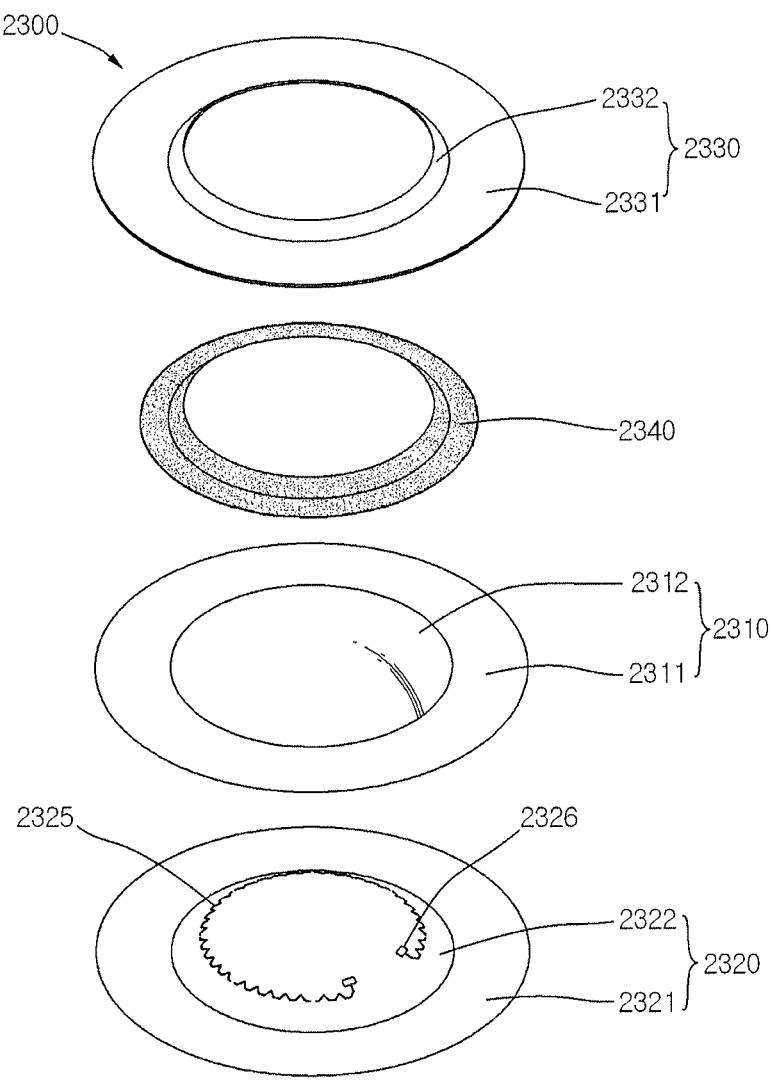

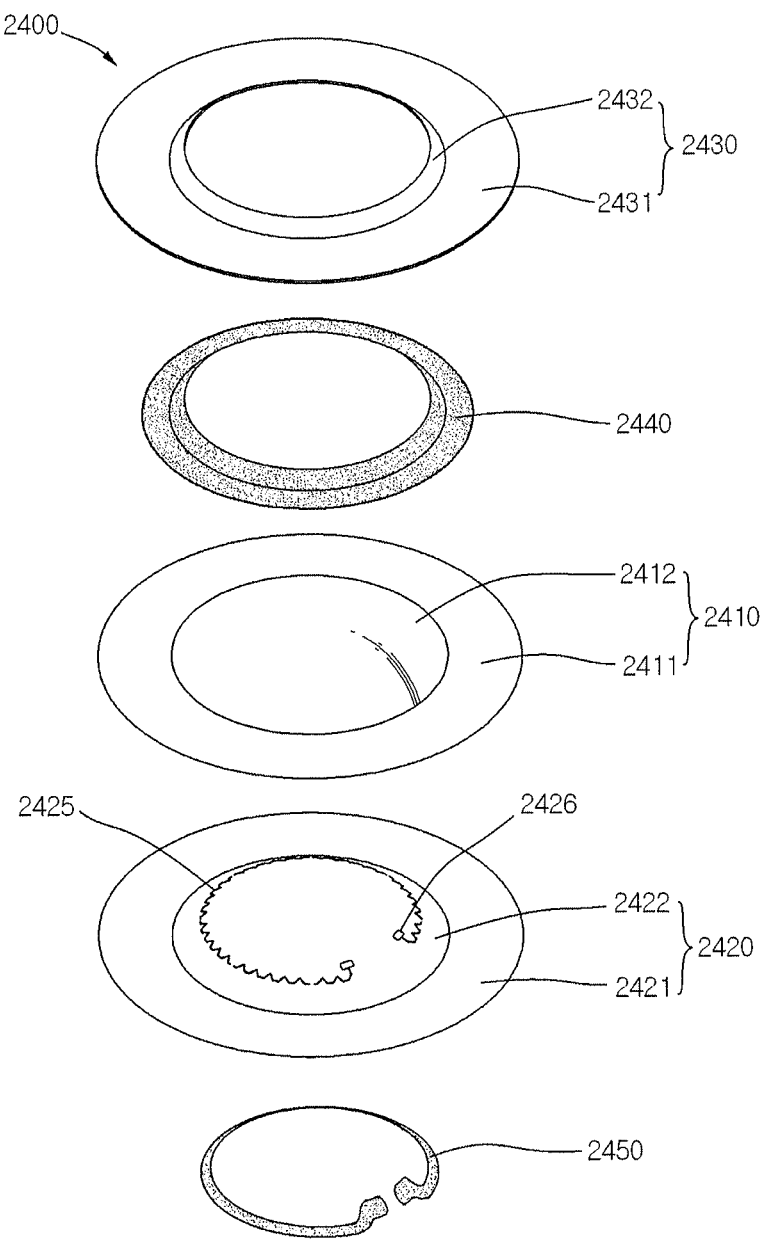

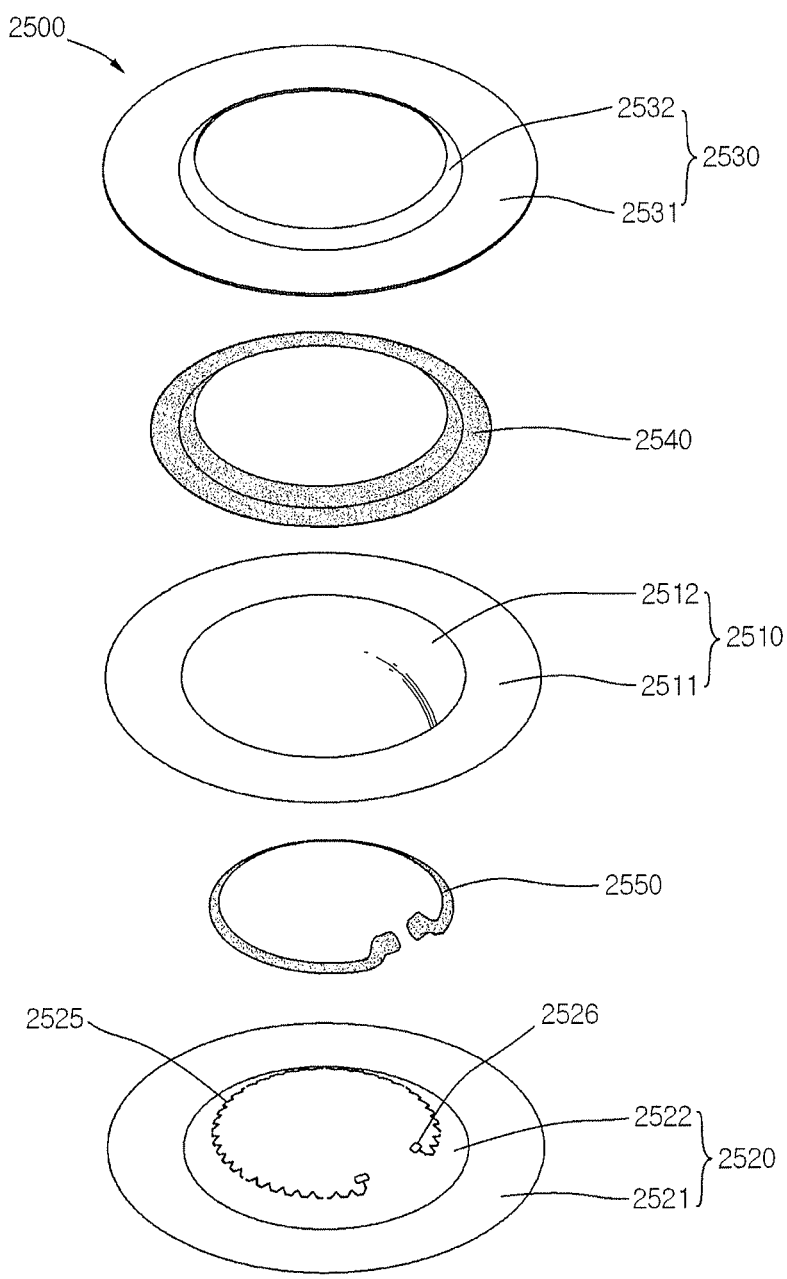

RUPTURE DISK AND GAS INSULATED SWITCHGEAR HAVING THE SAME

CROSS REFERENCE TO RELATED APPLICATION

This application claims the benefit of Korean Patent Application No. 10-2012-0077055, filed on Jul. 16, 2012, and Korean Patent Application No. 10-2012-0095946, filed on Aug. 30, 2012, entitled "Rupture Disk and Gas Insulated Switchgear Having the Same", which is hereby incorporated by reference in its entirety into this application.

BACKGROUND

1. Field

The present invention relates to a rupture disk capable of minimizing damage to a system by allowing insulated gas to be discharged in advance at the time of an increase in an internal pressure, and a gas insulated switchgear having the same.

2. Description of the Related Art

In a gas insulated switchgear (GIS), which is one of the circuit breakers in various electric circuits. GIS is filled by gas as an insulator in the circuit breaker. A sulphur hexafluoride ($SF_6$) gas that has been spotlighted as an insulated gas has an insulation effect three times higher than that of air. This insulation effect increases when a pressure is applied to the sulphur hexafluoride ($SF_6$) gas. Due to these electrical characteristics of the $SF_6$ gas, the circuit breaker may obtain a good insulation performance even in a space smaller than that of an existing case, it has been mainly used in the gas insulated switchgear accordingly.

When the gas insulated switchgear in which the $SF_6$ gas is filled is maintained under a predetermined pressure, a problem does not occur. However, in the gas insulated switchgear in which the $SF_6$ gas is filled, when a short circuit occurs due to an electrical accident, energy suddenly increases to raise a temperature, an internal pressure suddenly increases accordingly and a pressure container explodes. In this case, a recovery time increases, which may cause economical loss to astronomically increase and damage to the environment and human life. Therefore, it is important to prevent explosion of an apparatus in advance.

In order to solve the sudden increase in the pressure in the gas insulated switchgear, a spring type safety valve has been suggested. However, in the spring type safety valve, it is often difficult to solve an unexpected sudden increase in an accidental pressure rise. Further, in order to solve this problem, a scheme of using a rupture disk has also been suggested. However, in this scheme, there is a disadvantage in that fragments are blocked, such that a pressure does not smoothly decrease or a human is injured by the fragments.

SUMMARY

An object of the present invention is to provide a rupture disk discharging an excess pressure to surrounding place when a pressure of a safety limitation pressure or an appropriate pressure or more is applied thereto so as to cope with a sudden increase in a pressure due to an unexpected fault of an inner portion of a gas insulated switchgear to minimize damage to a device and prevent a large accident or damage to a human in advance, and a gas insulated switchgear having the same.

Another object of the present invention is to provide a rupture disk closely adhered to a portion at which discharging of a large amount of insulated gas is instantaneously required in a gas insulated switched gear or a portion at which damage is not generated at the time of discharging the insulated gas in the gas insulated switched gear to thereby be formed integrally with the above-mentioned portion and safely ruptured in advance at the time of a sudden increase in a pressure to prevent damage to the entire pressure container, and a gas insulated switchgear having the same.

According to an exemplary embodiment of the present invention, there is provided a rupture disk for a gas insulated switchgear, including: a thin dome plate including a first flange portion and a first dome-shaped portion formed in a dome shape at the center of the first flange portion; and a rupture guide plate including a second flange portion laminated on the first flange portion and a second dome-shaped portion having a plurality of slots formed to define a rupture shape so that a part of the first dome-shaped portion is ruptured in a predetermined shape when an internal pressure increases, wherein end portions of slots disposed at both edges among the plurality of slots are provided with rupture restriction openings, respectively, to configure a hinge portion of the second dome-shaped portion.

Each of the plurality of slots may include an arc inner profile and a sawtooth outer profile, the sawtooth outer profile may include inner vortexes and outer vortexes that are alternately arranged, and the slot and another slot adjacent thereto may be connected to each other by a rupture bridge at an outer vortex of the sawtooth outer profile.

The rupture disk may further include a support plate including a third flange portion laminated on the first flange portion, wherein the third flange portion has an opening formed at a center portion thereof in order to provide a space in which the first dome-shaped portion is to be installed.

The rupture disk may further include a first support plate including a third flange portion laminated on the second flange portion, wherein the third flange portion has an open type support formed at a center portion thereof in order to support an edge portion of the first dome-shaped portion.

The rupture disk may further include a second support plate including a fourth flange portion laminated on the first flange portion, wherein the fourth flange portion has an opening formed at a center portion thereof in order to provide a space in which the first dome-shaped portion is to be installed.

The thin dome plate may further include a first protrusion portion protruding at at least one portion of the first flange portion in a radial direction, and the rupture guide plate may further include a second protrusion portion protruding at a position corresponding to that of the first protrusion portion in the radial direction.

Each of the first flange portion and the second flange portion may be provided with a plurality of fastening holes through which fastening bolts pass and which are formed in a circumferential direction.

The first flange portion and the second flange portion may be pressure-welded and coupled to each other at a plurality of positions in a circumferential direction.

Each of the plurality of slots may include an inner profile and an outer profile, wherein the inner profile includes arc or oval patterns that are arranged at predetermined interval, and the outer profile includes sawtooth patterns that are repeatedly arranged.

The plurality of slots may be formed in a sawtooth line shape, and adjacent slots among the plurality of slots may be formed to have a predetermined interval therebetween to configure a rupture bridge.

The rupture restriction opening and the slot may be connected to each other by a connection slot.

According to another exemplary embodiment of the present invention, there is provided a rupture disk for a gas insulated switchgear, including: a thin dome plate including a first flange portion and a first dome-shaped portion formed in a dome shape at the center of the first flange portion; a rupture guide plate laminated inside the first flange portion and the first dome-shaped portion and including a second flange portion laminated on the first flange portion and a second dome-shaped portion having a plurality of slots formed to define a rupture shape so that a part of the first dome-shaped portion is ruptured in a predetermined shape when an internal pressure increases; and a thin protecting plate laminate outside the first flange portion and the first dome-shaped portion so as to protect the thin dome plate and including a third flange portion laminated on the first flange portion and an open dome-shaped protecting surface protecting an outer portion of the first dome-shaped portion.

The rupture disk may further include a flexible sealing layer disposed between the first flange portion and the third flange portion or between the first dome-shaped portion and the open dome-shaped protecting surface and formed so as to maintain air-tightness between the first flange portion and the third flange portion or between the first dome-shaped portion and the open dome-shaped protecting surface.

The flexible sealing layer may be made of a silicone resin or a silicone rubber.

According to still another exemplary embodiment of the present invention, there is provided a gas insulated switchgear including the rupture disk as described above.

BRIEF DESCRIPTION OF THE DRAWINGS

FIGS. 14A to 14D are plan views showing various patterns of a slot that may be formed in the rupture guide plate according to the present invention;

FIGS. 15A to 15D are plan views showing various connection patterns between adjacent slots that may be formed in the rupture guide plate according to the present invention;

FIGS. 16A to 16D are plan views showing various patterns of a hinge portion that may be formed in the rupture guide plate according to the present invention;

FIG. 17 is a perspective view showing a state in which a rupture disk 2300 according to an eighth exemplary embodiment of the present invention is assembled;

FIG. 18 is an exploded perspective view showing a laminated state of the rupture disk 2300 of FIG. 17;

FIG. 19 is an exploded perspective view of a rupture disk 2400 according to a ninth exemplary embodiment of the present invention; and FIG. 20 is an exploded perspective view of a rupture disk 2500 according to a tenth exemplary embodiment of the present invention.

DETAILED DESCRIPTION

Hereinafter, a rupture disk and a gas insulated switchgear according to exemplary embodiments of the present invention will be described in detail with reference to the accompanying drawings.

Figure 1:
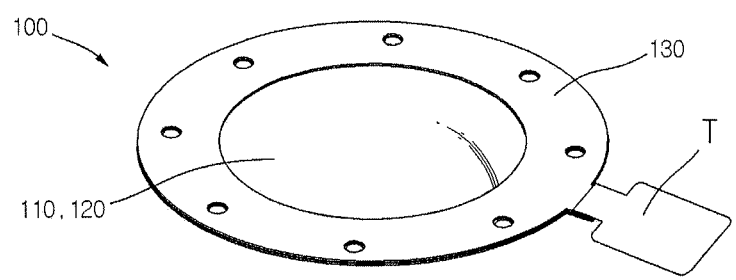
FIG. 1 is a perspective view showing a state in which a rupture disk 100 according to a first exemplary embodiment of the present invention is assembled.
Figure 2:
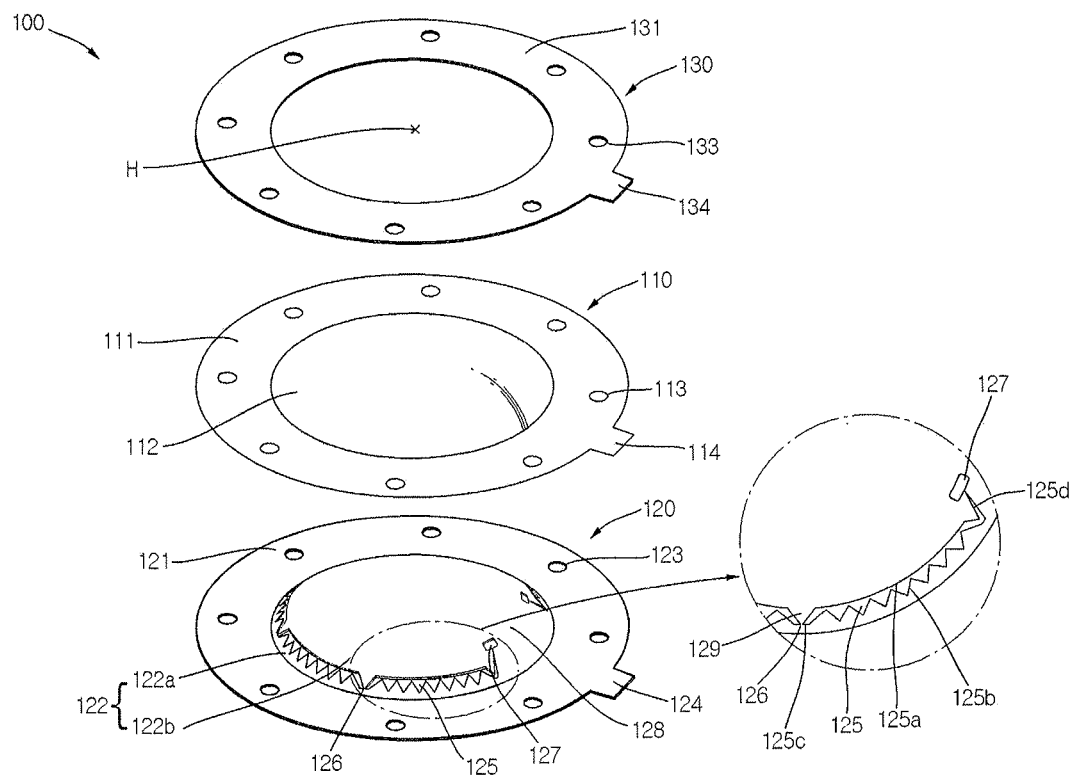
FIG. 2 is an exploded perspective view showing a laminated state of the rupture disk 100 of FIG. 1.

FIG. 1 is a perspective view showing a state in which a rupture disk 100 according to a first exemplary embodiment of the present invention is assembled; and FIG. 2 is an exploded perspective view showing a laminated state of the rupture disk 100 of FIG. 1.

As shown in FIGS. 1 and 2, the rupture disk 100 has a form in which a plurality of plates are laminated. More specifically, the rupture disk 100 includes a thin dome plate 110, a rupture guide plate 120, and a support plate 130. These plates are mutually laminated and assembled to have an assembly form as shown in FIG. 1. The rupture disk 100 has a tap T attached to one side thereof in order to display various specifications of the rupture disk 100. The assembled rupture disk 100 is formed in a dome shape in which a central portion thereof is convex and is assembled so that a convex dome portion is directed toward a container of a gas insulated switchgear.

The thin dome plate 110 is configured to maintain air-tightness with respect to an insulated gas such as an $SF_6$ gas filled in the gas insulated switchgear in a predetermined pressure range and be ruptured at a pressure of a predetermined pressure or more. Referring to FIG. 2, the thin dome plate 110 has a first flange portion 111 and a first dome-shaped portion 112 formed in a dome shape at an inner side of the first flange portion 111.

The first flange portion 111, which is closely adhered to an opening surface of the gas insulated switchgear, is provided with a plurality of fastening holes 113 through which fastening bolts may pass and which are formed in a circumferential direction. The first dome-shaped portion 112, which is installed to be depressed toward an inner portion of the gas insulated switchgear, may have a form in which it is depressed toward the inner portion of the gas insulated switch gear at the time of a normal operation and be deformed in a reverse direction when an internal pressure increases to protrude outwardly. The thin dome plate 110, which is formed in a thin metal sheet form, may have various thicknesses according to a rupture capacity.

One side of the first flange portion 111 is provided with a first protrusion portion 114 protruding from the first flange portion 111. The first protrusion portion 114, which has a form in which it is formed integrally with an extended plane of the first flange portion 111, provides a region to which a tag T capable of displaying a performance of a specification of the rupture disk 100 may be attached by spot welding.

The rupture guide plate 120, which is disposed on a rear surface of the thin dome plate 110 in a relationship with the gas insulated switchgear, is generally formed in a shape corresponding to that of the thin dome plate 110. More specifically, the rupture guide plate 120 also includes a second flange portion 121 laminated on the first flange portion 111 and a second dome-shaped portion 122 formed in a dome shape corresponding to that of the first dome-shaped portion 112. The second dome-shaped portion 122 has slots 125 formed to define a rupture shape so that the first dome-shaped portion 122 may be ruptured in a predetermined shape at a limitation pressure in the case in which the internal pressure increases. The second dome-shaped portion 122 is divided into a support dome 122a and a flap dome 122b by the slots 125. When the internal pressure is applied to the thin dome plate 110, the flap dome 122b provides a space in which the thin dome plate 100 may be ruptured and expanded, which being separated from the support dome 122a and opened.

The second flange portion 121 is provided with a plurality of fastening holes 113 through which the fastening bolts may pass and is provided with a second protrusion portion 124 at a position corresponding to that of the first protrusion portion 114, similar to the first flange portion 111. The second protrusion portion 124, which has a form in which it is formed integrally with an extended plane of the second flange portion 121, is closely adhered to the first protrusion portion 114.

Referring to an enlarged view of FIG. 2, the slot 125 of the rupture guide plate 120 has a form in which it includes an arc inner profile 125a and a sawtooth outer profile 125b. The sawtooth outer profile 125b provides a sharp vortex so that the thin dome plate 110 to which the pressure is applied may be easily ruptured. The slot 125 generally has a form in which it includes a plurality of unit slots having an arc shape.

One unit slot is connected to another unit slot adjacent thereto by a rupture bridge 126. The rupture bridge 126 becomes one parameter for determining a rupture pressure when the pressure is applied to the thin dome plate 110. Therefore, a shape or a size of the rupture bridge may also be designed according to a set rupture pressure. Referring to an enlarged view of FIG. 2, the sawtooth outer profile 125b includes inner vortexes and outer vortexes that are alternately arranged. The rupture bridge 126 between the unit slots is positioned at the outer vortex 125c of the sawtooth outer profile 125b rather than the inner vortex of the sawtooth outer profile 125b. Therefore, the flap dome 122b is formed in a generally circular shape by the arc inner profiles 125a, but includes a triangular protrusion portion 129 in order to form the rupture bridge 126.

The unit slots configuring the slot 125 are arranged at predetermined angle intervals in a circumferential direction, and two of the unit slots among them may be formed to have a distance therebetween larger than a distance therefrom to the rupture bridge 126 to configure a hinge portion 128 of the second dome-shaped portion 122. End portions of the adjacent two unit slots defining the hinge portion 128 are provided with rupture restriction openings 127, respectively. The rupture restriction open 127 prevents damage to the hinge portion 128 at the time of rupture of the rupture guide plate 120 and prevents the flap dome 122b from being separated from the support dome 122a at the time of the rupture of the rupture guide plate 120. A shape or a size of the rupture restriction opening 127 is another parameter for determining the rupture pressure or the rupture shape and is designed according to a set rupture pressure. The rupture guide plate 120 includes a connection slot 125d so that the slot 125 and the rupture restriction opening 127 may be connected to each other. A shape of the connection slot 125d may be still another parameter for detecting the rupture pressure and be designed according to a set rupture pressure.

The support plate 130 may be laminated on the thin dome plate 110 or the rupture guide plate 120. In FIG. 2, the case in which the support plate 130 is laminated on the thin dome plate 110 is shown. Therefore, the support plate 130 is positioned between the thin dome plate 110 and the gas insulated switchgear and serves to maintain the air-tightness and support the thin dome plate 110. The support plate 130 includes a third flange portion 131 laminated on the second flange portion 121, wherein the third flange portion 131 has an opening H formed at the center thereof in order to provide a space in which the first dome-shaped portion 112 of the thin dome plate 110 is to be installed. The third flange portion 131 is provided with a plurality of fastening holes 133 through which the fastening bolts may pass and is provided with a third protrusion portion 134 at a position corresponding to those of the first protrusion portion 114 and the second protrusion portion 124, similar to the first flange portion 111 and the second flange portion 121. The third protrusion portion 134, which has a form in which it is formed integrally with an extended plane of the third flange portion 131, is closely adhered to the first protrusion portion 114 and the second protrusion portion 124.

Figure 3:
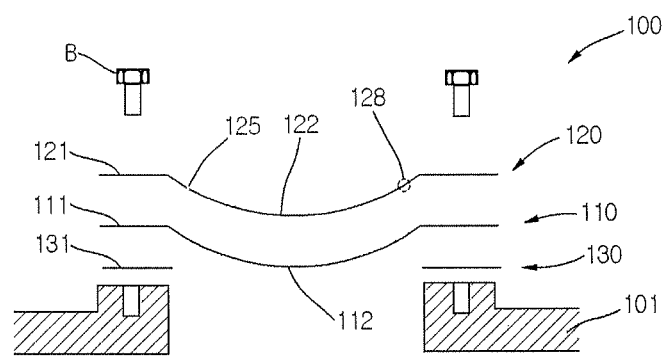
FIG. 3 is a lateral cross-sectional view for describing a state in which the rupture disk 100 of FIG. 1 is assembled to an object 101.
Figure 4:
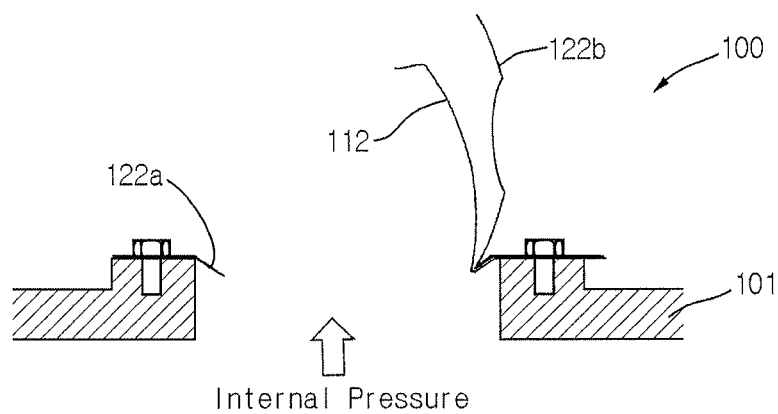
FIG. 4 is a lateral cross-sectional view schematically showing a state in which the rupture disk 100 of FIG. 3 is applied with an internal pressure to thereby be ruptured.

FIG. 3 is a lateral cross-sectional view for describing a state in which the rupture disk 100 of FIG. 1 is assembled to an object 101; and FIG. 4 is a lateral cross-sectional view schematically showing a state in which the rupture disk 100 of FIG. 3 is applied with an internal pressure to thereby be ruptured.

The first flange portion 111 of the thin dome plate 110, the second flange portion 121 of the rupture guide plate 120, and the third flange portion 131 of the support plate 130 that configure the rupture disk 100 may be pressure-welded and coupled to one another at a plurality of positions in the circumferential direction. The thin dome plate 110, the rupture guide plate 120, and the support plate 130 are configured integrally with one another by the pressure-welding, and the convex portions of the first dome-shaped portion 112 and the second dome-shaped portion 122 are fastened to the object 101 so as to be directed toward the inner portion of the gas insulated switchgear. Therefore, the air-tightness of the $SF_6$ gas is maintained by the thin dome plate 110, and an internal pressure of a set value or less is maintained by the rupture guide plate 120 and the support plate 130.

When a pressure of the gas insulated switchgear exceeds an appropriate pressure in a state in which the rupture disk 100 is mounted, the first dome-shaped portion 112 of the thin dome plate 110 and the second dome-shaped portion 122 of the rupture guide plate 120 are instantaneously deformed in a reverse direction, and the rupture bridge 126 is first ruptured at a limitation pressure, such that the flap dome 122b of the rupture guide plate 120 suddenly sinks (open). In this case, since the support dome 122a of the rupture guide plate 120 is fixed, the thin dome plate 110 is cut in the same shape as that of the sawtooth outer profile 125b by a punch action generated by a gas pressure.

Figure 5:
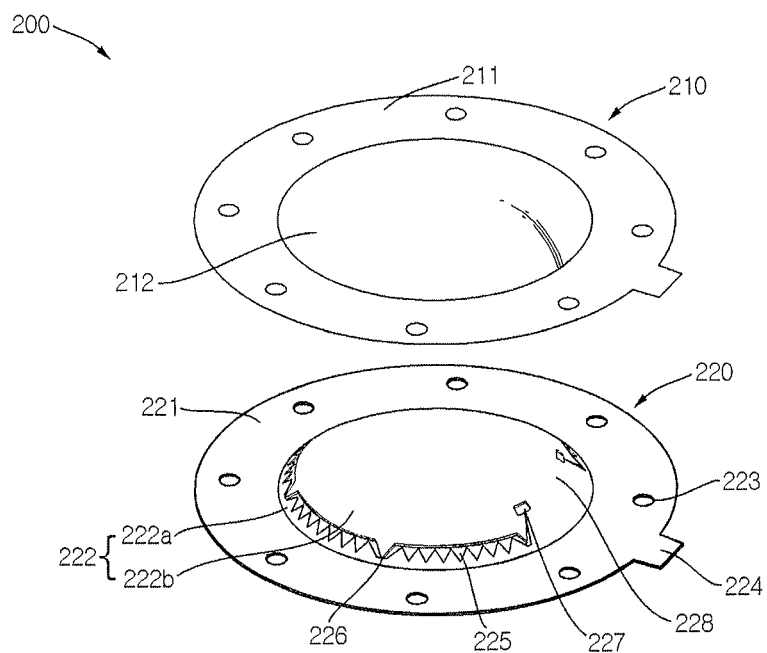
FIG. 5 is an exploded perspective view of a rupture disk 200 according to a second exemplary embodiment of the present invention.

FIG. 5 is an exploded perspective view of a rupture disk 200 according to a second exemplary embodiment of the present invention.

The rupture disk 200 according to the present embodiment includes only a thin dome plate 210 and a rupture guide plate 220. In the case in which a stable structure may be maintained only with the rupture guide plate 220 according to a pressure degree, the rupture disk is completed only with a laminate of the thin dome plate 210 and the rupture guide plate 220 without the support plate 130 described above. Other components will be denoted by reference numerals similar to those of the first exemplary embodiment, and a description thereof will be replaced by the description in the first exemplary embodiment. Also in exemplary embodiments to be described below, a detailed description of components denoted by reference numerals similar to those of the first exemplary embodiment will be omitted.

Figure 6:
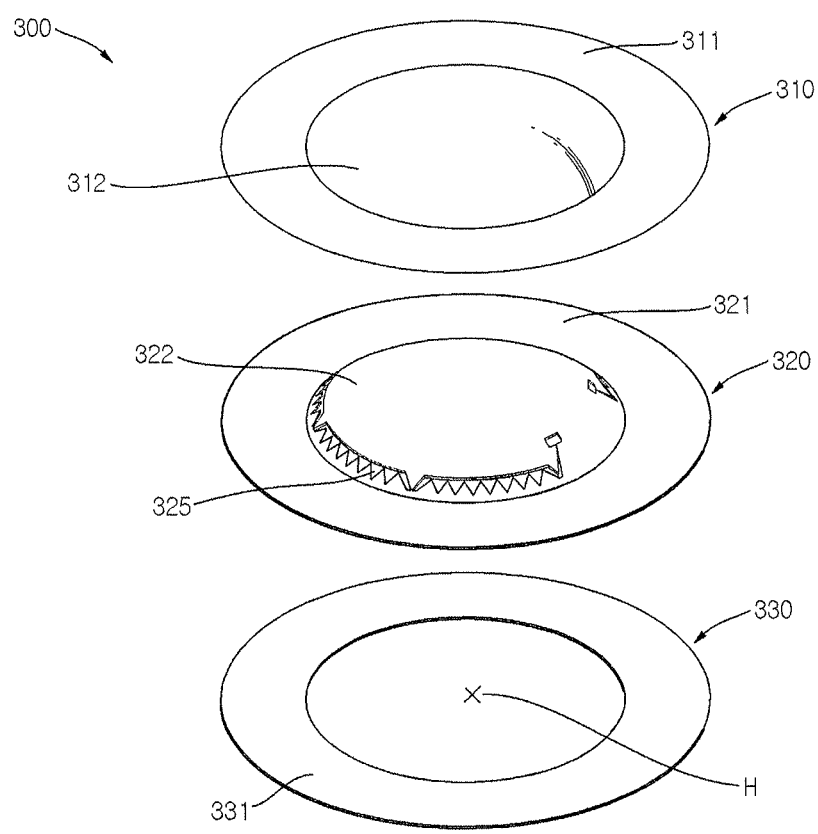
FIG. 6 is an exploded perspective view of a rupture disk 300 according to a third exemplary embodiment of the present invention.

FIG. 6 is an exploded perspective view of a rupture disk 300 according to a third exemplary embodiment of the present invention.

The rupture disk 300 according to the present embodiment includes a thin dome plate 310, a rupture guide plate 320, and a support plate 330, but has a structure in which the support plate 330 is directly laminated on the rupture guide plate 320, unlike the first exemplary embodiment. In addition, according to a structure or a shape of a mounting portion of the gas insulated switchgear that has been already designed, the fastening holes or the protrusion portions may also be omitted in the present embodiment.

Figure 7:
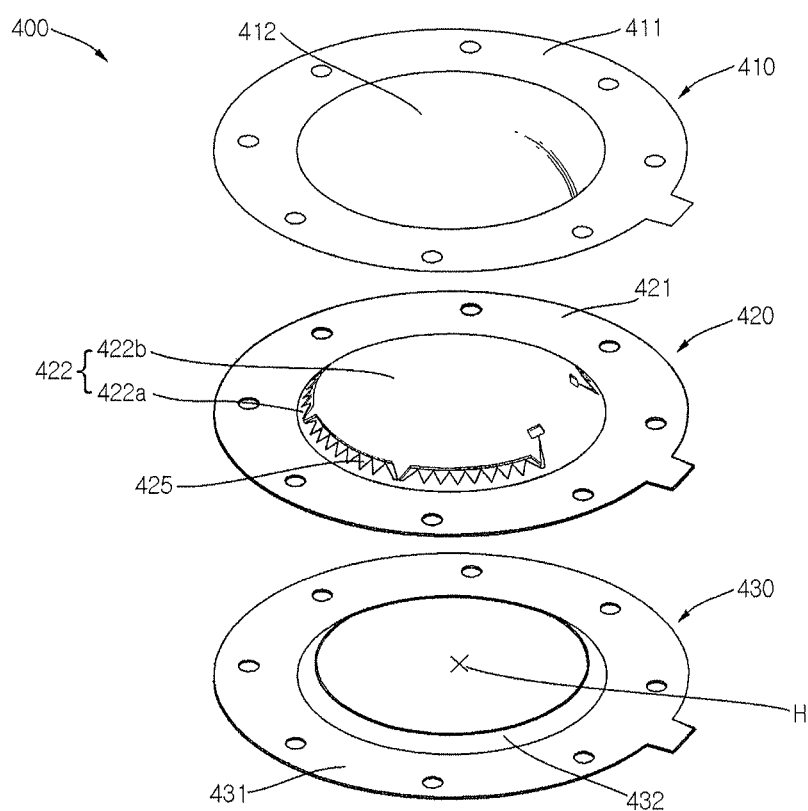
FIG. 7 is an exploded perspective view of a rupture disk 400 according to a fourth exemplary embodiment of the present invention.

FIG. 7 is an exploded perspective view of a rupture disk 400 according to a fourth exemplary embodiment of the present invention.

The rupture disk 400 according to the present embodiment also includes a thin dome plate 410, a rupture guide plate 420, and a support plate 430, and has a structure in which the support plate 430 is directly laminated on the rupture guide plate 420. On the other hand, in the present embodiment, the support plate 430 is provided with an open type support 432, unlike the third exemplary embodiment. The open type support 432 supports a support dome 422b of the rupture guide plate 420 so as not to be deformed due to a gas pressure and allows a punch action to be appropriately performed.

Figure 8:
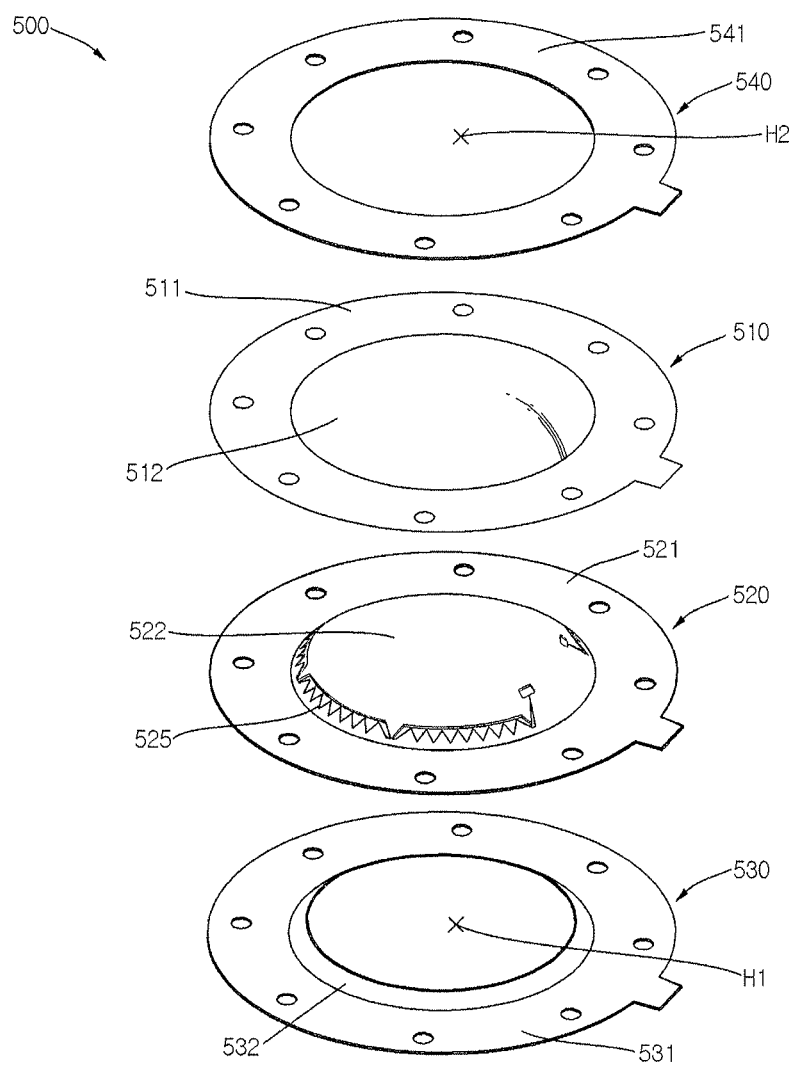
FIG. 8 is an exploded perspective view of a rupture disk 500 according to a fifth exemplary embodiment of the present invention.

FIG. 8 is an exploded perspective view of a rupture disk 500 according to a fifth exemplary embodiment of the present invention.

The rupture disk 500 according to the present embodiment includes a thin dome plate 510, a rupture guide plate 520, a first support plate 530, and a second support plate 540. The first support plate 530 may be provided with an open type support 532. The second support plate 530 includes a fourth flange portion 541 and has an open hole H2 formed at the center thereof.

The disposition of the support plates 530 and 540 as described above allows the thin dome plate 510 to be accurately ruptured in a set pressure range at the time of rupture and increases reliability.

Figure 9:
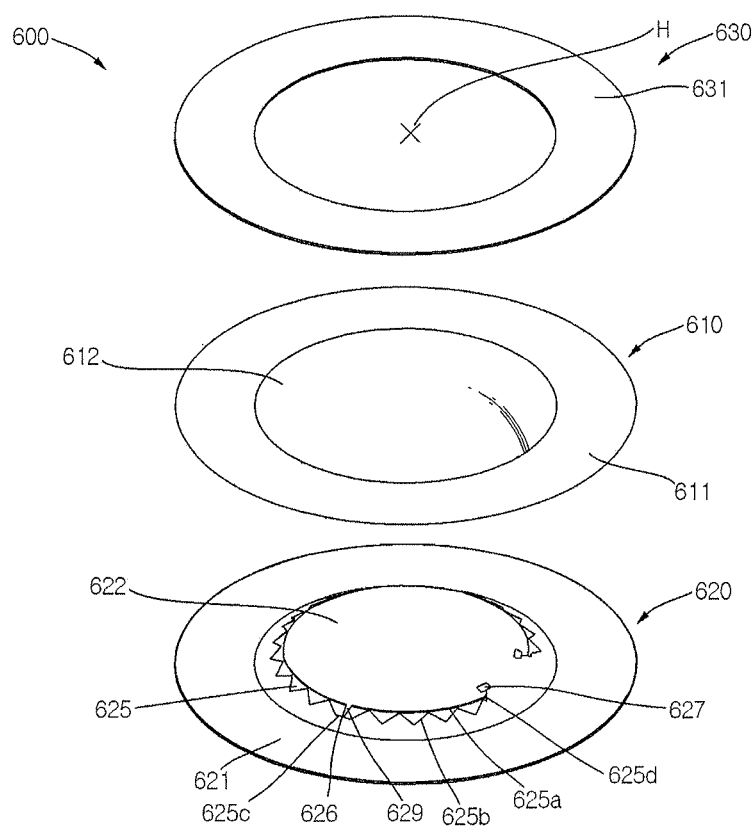
FIG. 9 is an exploded perspective view of a rupture disk 600 according to a sixth exemplary embodiment of the present invention.

FIG. 9 is an exploded perspective view of a rupture disk 600 according to a sixth exemplary embodiment of the present invention.

The rupture disk 600 according to the present embodiment includes a thin dome plate 610, a rupture guide plate 620, and a support plate 630. Here, in the rupture disk 600 according to the present embodiment, shapes of a slot 625, a sawtooth outer profile 625b configuring the slot 625, a connection slot 625d, and a protrusion portion 629 are slightly different from those of the rupture disk according to the first exemplary embodiment. Also in the rupture disk 600 according to the present embodiment, a rupture bridge 626 is positioned at an outer vortex 625c of the sawtooth outer profile 625b.

Figure 10:
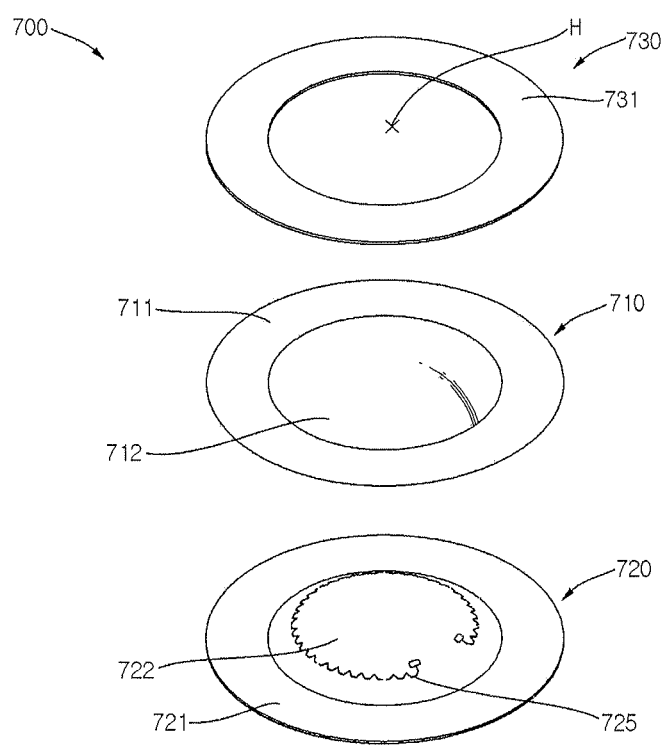
FIG. 10 is an exploded perspective view of a rupture disk 700 according to a seventh exemplary embodiment of the present invention.

FIG. 10 is an exploded perspective view of a rupture disk 700 according to a seventh exemplary embodiment of the present invention.

The rupture disk 700 according to the present embodiment includes a thin dome plate 710, a rupture guide plate 720, and a support plate 730. A slot 725 is formed in a line shape. Therefore, both of the inner profile and the outer profile are formed in a sawtooth shape.

Figure 11:
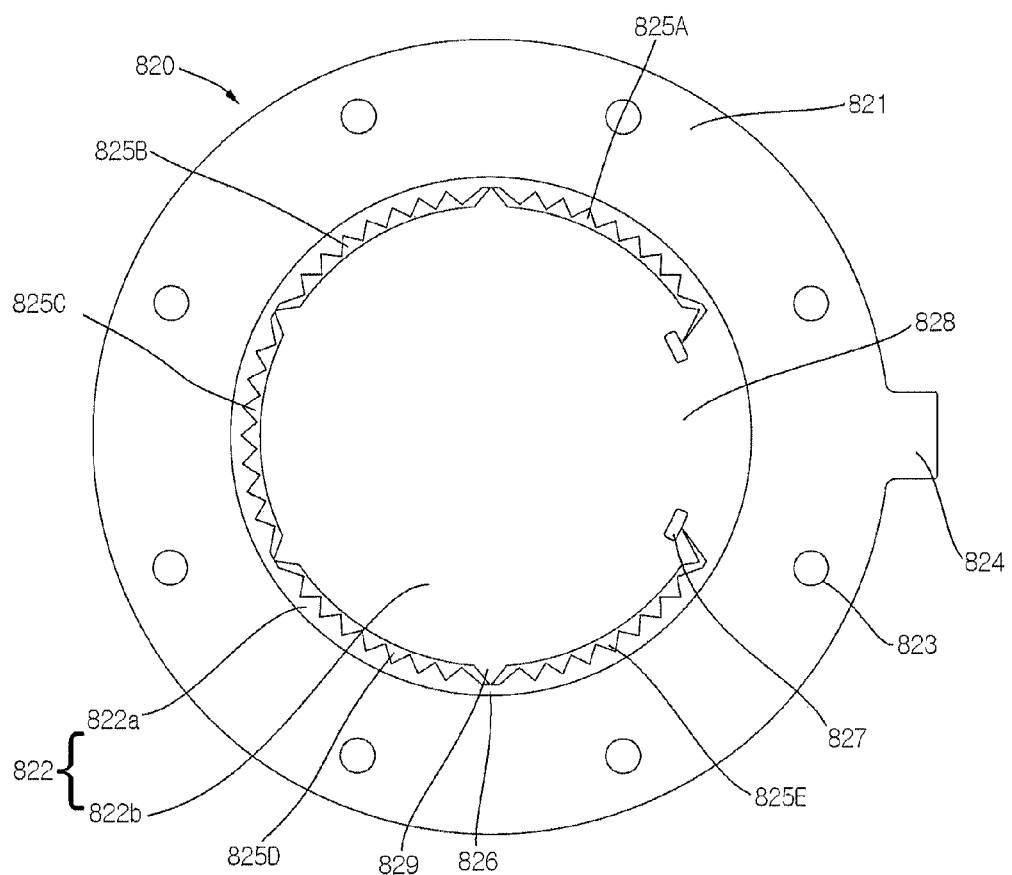
FIG. 11 is a plan view showing one form of a rupture guide plate that may be used in the rupture disk according to the present invention.

FIG. 11 is a plan view showing one form of a rupture guide plate that may be used in the rupture disk according to the present invention.

In the present example, the rupture guide plate 820 includes five slots 825A, 825B, 825C, 825D, and 825E connected to one another by four rupture bridges 826. A rupture restriction opening 827 and a hinge portion 828 are formed between the slots 825A and 825E disposed at edges. Each of the slots 825A, 825B, 825C, 825D, and 825E includes a sawtooth outer profile and an arc inner profile defining a rupture shape of the thin dome plate, and the rupture bridge 826 is positioned at an outer vortex of the sawtooth outer profile. The sawtooth outer profile may have seven sawteeth. In order to facilitate installation, the rupture guide plate 820 may be provided with fastening holes 823, and an edge of the flange portion 821 may be provided with a protrusion portion 824 to which a tag is attached.

Figure 12:
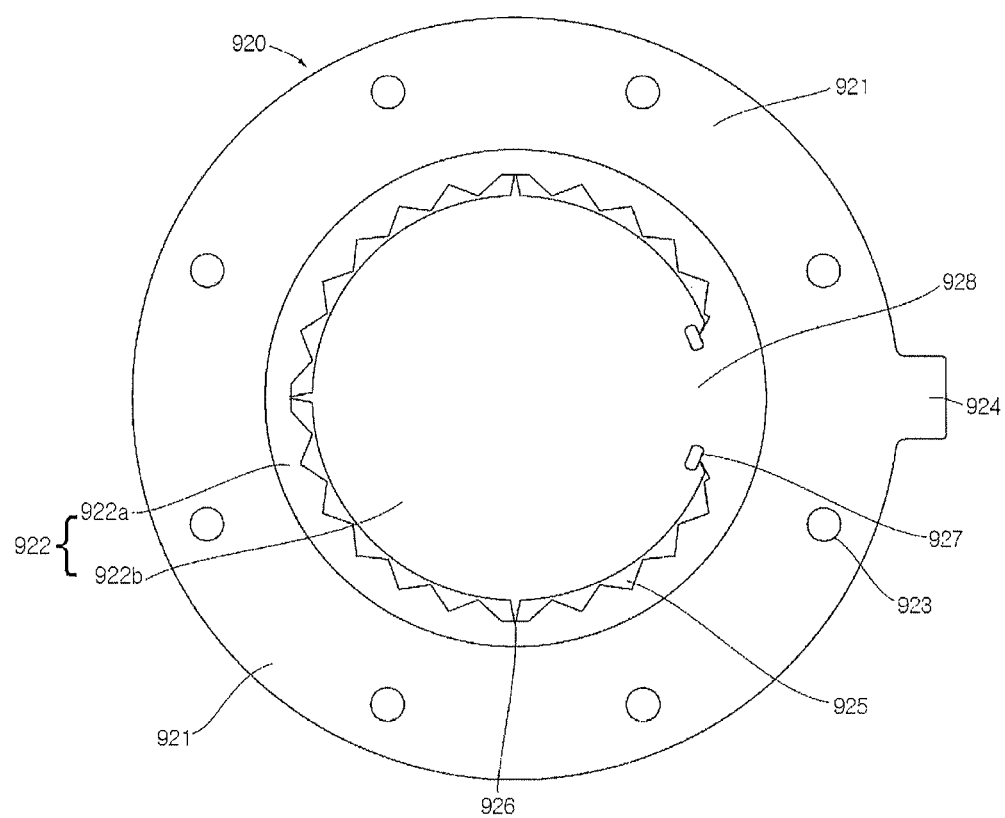
FIG. 12 is a plan view showing another form of a rupture guide plate that may be used in the rupture disk according to the present invention.

FIG. 12 is a plan view showing another form of a rupture guide plate that may be used in the rupture disk according to the present invention.

In the present example, the rupture guide plate 920 includes four slots 925 connected to one another by three rupture bridges 926. Also in the present example, the rupture bridge 926 is positioned at an outer vortex of a sawtooth outer profile. However, the sawtooth outer profile has five sawteeth.

Figure 13:
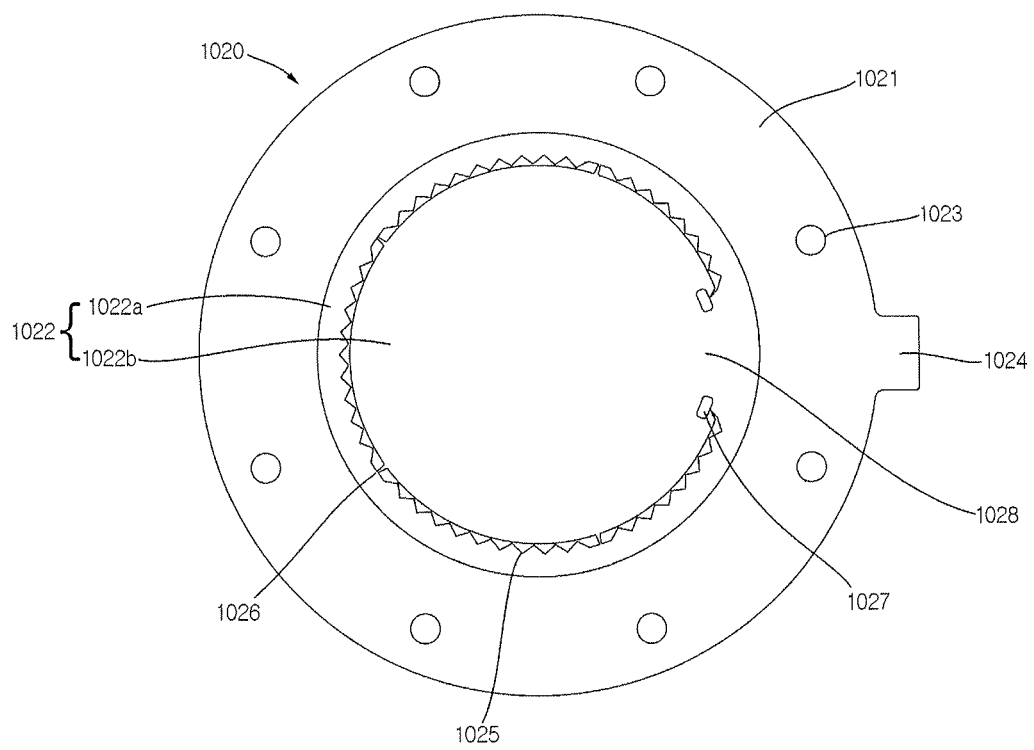
FIG. 13 is a plan view showing still another form of a rupture guide plate that may be used in the rupture disk according to the present invention.

FIG. 13 is a plan view showing still another form of a rupture guide plate that may be used in the rupture disk according to the present invention.

In the present example, the rupture guide plate 1020 includes five slots 1025 connected to one another by four rupture bridges 1026. Also in the present example, the rupture bridge 926 is positioned at an outer vortex of a sawtooth outer profile. However, the sawtooth outer profile has seven sawteeth.

FIGS. 14A to 14D are plan views showing various patterns of a slot that may be formed in the rupture guide plate according to the present invention.

FIG. 14A shows a slot 1125 formed in a line shape, and FIG. 14B shows a slot 1125 in which both of the inner profile and the outer profile are formed in a sawtooth shape and are spaced apart from each other by a predetermined gap. A slot 1325 shown in FIG. 14C has a sawtooth outer profile and a geometric inner profile including arc or oval patterns. A slot 1425 shown in FIG. 14D has a sawtooth outer profile and an arc inner profile. These slots may be selectively used in connection with a thickness of the used thin dome plate, a thickness of the used rupture guide plate, a set rupture pressure, or the like, or may be used in combination on one rupture guide plate. A size of a design slot and the number of sawteeth in the design slot are associated with the number of rupture bridges and a rupture pressure. Generally, when the number of rupture bridges increases, the number of sawteeth decreases.

FIGS. 15A to 15D are plan views showing various connection patterns between adjacent slots that may be formed in the rupture guide plate according to the present invention.

As shown in FIG. 15A, slots 1525 having a line shape may be connected to each other by a rupture bridge 1526 having only a predetermined distance. FIG. 15B shows that a rupture bridge 1626 is positioned at an inner vortex portion of a sawtooth outer profile in a slot 1626 having an arc inner profile and the sawtooth outer profile. In a slot 1725 shown FIG. 15C, a sawtooth outer profile has a straight line or arc section in order to form a rupture bridge 1726. The rupture bridge 1726 has a wide width at an inner side thereof and a narrow width at an outer side thereof. On the other hand, a rupture bridge 1826 of FIG. 15D has a narrow width at an inner side thereof and a wide width at an outer side thereof. These rupture bridges may be selectively used in connection with a thickness and a material of the used thin dome plate, a thickness and a material of the used rupture guide plate, a set rupture pressure, or the like, or may be used in combination on one rupture guide plate.

FIGS. 16A to 16D are plan views showing various patterns of a hinge portion that may be formed in the rupture guide plate according to the present invention.

As shown in FIG. 16A, two rupture restriction openings 1927 having a large hole shape are formed and a hinge portion 1928 is formed by the two rupture restriction openings 1927 so that the rupture guide plate may be easily hinged when it is ruptured. A slot 1925 and the rupture restriction opening 1927 are not connected to each other, but have a rupture bridge 1926 formed therebetween, wherein the rupture bridge serves as a second hinge. In FIG. 16B, a rupture restriction opening 2027 having a small rectangular shape is formed, and the rupture restriction opening 2027 and a slot 2025 are connected to each other in a line shape. In FIG. 16C, a rupture restriction opening 2127 having a small rectangular shape is formed, and the rupture restriction opening 2127 and a slot 2125 are connected to each other in a poly-line shape. In FIG. 16D, a rupture restriction opening 2227 having a small rectangular shape is formed, and the rupture restriction opening 2227 and a slot 2225 are also connected to each other in a poly-line shape. However, the slot 2225 connected to the rupture restriction opening 2227 separately includes a rupture bridge 2226.

FIG. 17 is a perspective view showing a state in which a rupture disk 2300 according to an eighth exemplary embodiment of the present invention is assembled; and FIG. 18 is an exploded perspective view showing a laminated state of the rupture disk 2300 of FIG. 17. As shown in FIGS. 17 and 18, the rupture disk 2300 has a form in which a plurality of plates are laminated. More specifically, the rupture disk 2300 includes a thin dome plate 2310, a rupture guide plate 2320, and a thin protecting plate 2330. These plates are laminated as shown in FIG. 18 to have an assembly form as shown in FIG. 17.

Referring to FIG. 18, the rupture disk according to the present embodiment may include a flexible sealing layer 2340 disposed between a first flange portion 2311 and a third flange portion 2331 or between a first dome-shaped portion 2312 and an open dome-shaped protecting surface 2332. The flexible sealing layer 2340, which is formed so as to maintain air-tightness between the first flange portion 2311 and the third flange portion 2331 or between the first dome-shaped portion 2312 and the open dome-shaped protecting surface 2332, blocks a sand or a foreign material from penetrating into a gap between the thin dome plate 2310 and the thin protecting plate 2330. In the case in which the sand or the foreign materials is inserted, durability or a rupture pressure of the thin dome plate 2310 may be affected, which is prevented in advance by the flexible sealing layer 2340.

The flexible sealing layer 2340, which is made of a silicone resin or a silicone rubber, may be obtained by applying and curing the silicone resin or the silicone rubber to a target region. A masking member may be used in a manufacturing process so that the silicone resin or the silicone rubber is prevented from being leaked and is applied only to a predetermined region when it is applied. As the masking member, a release film or a release agent may be used.

FIG. 19 is an exploded perspective view of a rupture disk 2400 according to a ninth exemplary embodiment of the present invention.

The rupture disk 2400 according to the present embodiment further includes a foreign material blocking layer 2450, in addition to a thin dome plate 2410, a rupture guide plate 2420, a thin protecting plate 2430, and a flexible sealing layer 2440. The foreign material blocking layer 2450, which blocks a sand or a foreign material from penetrating into a slot 2425, a rupture restriction opening 2426, or the like, which is a portion exposed to the outside during handling, is made of a silicone resin or a silicone rubber, similar to the flexible sealing layer 2440. FIG. 19 shows that the foreign material blocking layer 2450 is formed at an inner side of the rupture guide plate 2420, more specifically, an inner side of a second dome-shaped portion 2422 of the rupture guide plate 2420. The foreign blocking layer 2450 continuously maintains reliability of the rupture disk 2400 in a desert or an environment in which a large amount of dust is present.

FIG. 20 is an exploded perspective view of a rupture disk 2500 according to a tenth exemplary embodiment of the present invention.

In the rupture disk 2500 according to the present embodiment, a foreign material blocking layer 2550 is disposed between a thin dome plate 2510 and a rupture guide plate 2520, unlike the foreign material blocking layer 2450 shown in FIG. 19. The foreign blocking layer 2550 also continuously maintains reliability of the rupture disk 2500 in a desert or an environment in which a large amount of dust is present.

With the rupture disk and the gas insulated switchgear according to the exemplary embodiments of the present invention, when an internal pressure of an insulated gas filled in the apparatus suddenly increases, the thin dome plate is ruptured to discharge the insulated gas, thereby making it possible to prevent damage to a pressure container and minimize enlargement loss.

According to the exemplary embodiments of the present invention, the rupture disk is accurately ruptured in an error range of a set pressure, thereby making it possible to safely discharge the $SF_6$ gas.

In the rupture disk and the insulated gas switchgear as described above, the configurations and the method according to the above-mentioned exemplary embodiments are not restrictively applied. All or some of the above-mentioned exemplary embodiments may also be selectively combined with each other so that various modifications may be made.

The invention claimed is:

1. A rupture disk for a gas insulated switchgear, the rupture disk comprising:
    a thin dome plate including a first flange portion and a first dome-shaped portion formed in a dome shape at the center of the first flange portion;
    a rupture guide plate laminated inside the first flange portion and the first dome-shaped portion and including a second flange portion laminated on the first flange portion and a second dome-shaped portion having a plurality of slots formed to define a rupture shape so that a part of the first dome-shaped portion is ruptured in a predetermined shape when an internal pressure increases;
    a thin protecting plate laminate outside the first flange portion and the first dome-shaped portion so as to protect the thin dome plate and including a third flange portion laminated on the first flange portion and an open dome-shaped protecting surface protecting an outer portion of the first dome-shaped portion; and a foreign material blocking layer disposed on an inner side of the second dome-shaped portion or between the thin dome plate and the rupture guide plate, and the foreign material blocking layer being configured to block sand or foreign material from penetrating into the plurality of the slots.

2. The rupture disk of claim 1, further comprising a flexible sealing layer disposed between the first flange portion and the third flange portion or between the first dome-shaped portion and the open dome-shaped protecting surface and formed so as to maintain air-tightness between the first flange portion and the third flange portion or between the first dome-shaped portion and the open dome-shaped protecting surface.

3. The rupture disk of claim 2, wherein the flexible sealing layer is made of a silicone resin or a silicone rubber.

4. A gas insulated switchgear including the rupture disk of claim 1.

5. The rupture disk of claim 1, wherein each of the plurality of slots includes an arc inner profile and a sawtooth outer profile, the sawtooth outer profile includes inner vortexes and outer vortexes that are arranged alternately, and the slots adjacent one another are connected to one another by a rupture bridge at an outer vortex of the sawtooth outer profile.

6. The rupture disk of claim 1, further comprising a support plate including a fourth flange portion laminated on the second flange portion, and the fourth flange portion has an open type support formed, at a center portion thereof, in order to support an edge portion of the second dome-shaped portion.

7. The rupture disk of claim 1, wherein the thin dome plate further includes a first protrusion portion protruding at at least one portion of the first flange portion in a radial direction, and the rupture guide plate further includes a second protrusion portion protruding at a position corresponding to that of the first protrusion portion in the radial direction.

8. The rupture disk of claim 1, wherein each of the first flange portion and the second flange portion is provided with a plurality of fastening holes which are formed in a circumferential direction through and through which fastening bolts pass.

9. The rupture disk of claim 1, wherein the first flange portion and the second flange portion are pressure-welded and coupled to one another at a plurality of positions adjacent a circumferential of the rupture disk.

10. The rupture disk of claim 1, wherein each of the plurality of slots includes an inner profile and an outer profile, the inner profile including arc or oval patterns that are arranged at predetermined interval, and the outer profile including sawtooth patterns that are repeatedly arranged.

11. The rupture disk of claim 1, wherein the plurality of slots are formed in a sawtooth line shape, and adjacent slots among the plurality of slots are formed so as to have a predetermined interval therebetween to form a rupture bridge.

12. The rupture disk of claim 1, wherein end portions of slots disposed at both edges among the plurality of slots are provided with rupture restriction openings, respectively, to configure a hinge portion of the second dome-shaped portion; and wherein a connection slot connects the slot and the rupture restriction opening with one another.

13. The rupture disk of claim 6, wherein end portions of slots disposed at both edges among the plurality of slots are provided with rupture restriction openings, respectively, to configure a hinge portion of the second dome-shaped portion; and wherein a connection slot connects the slot and the rupture restriction opening with one another.

* * * * *